Figure 1:
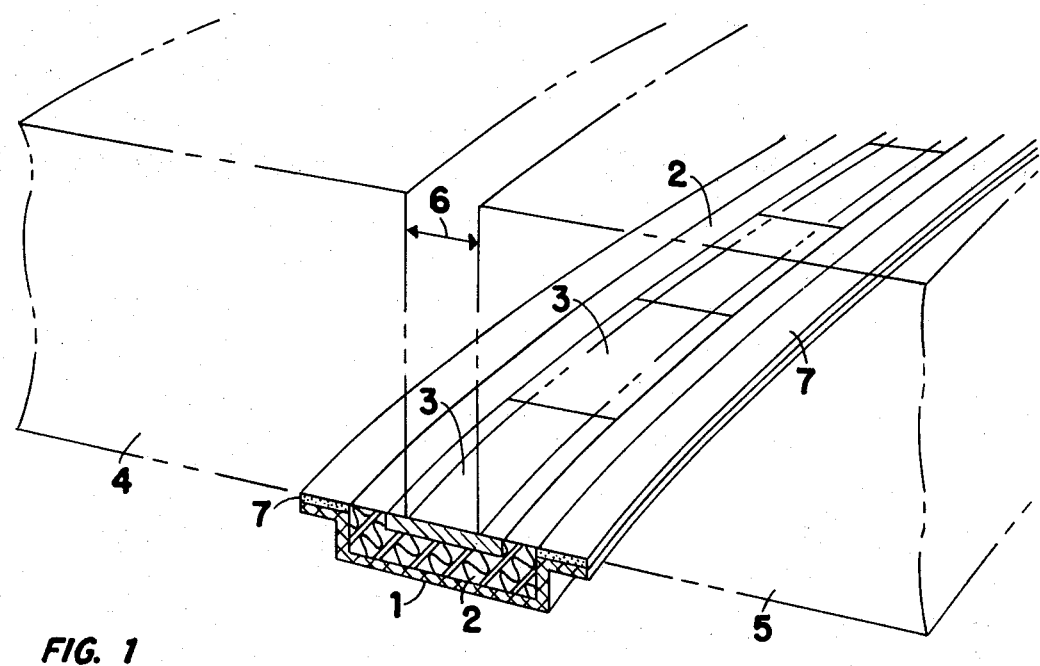

United States Patent [19]  [11] 3,777,114
Reynolds  [45] Dec. 4, 1973

[54] BACKUP TAPE FOR NARROW GAP WELDING

[76] Inventor: Richard W. Reynolds, 17306 Bryant Ln., Hazel Crest, Ill. 60429

[22] Filed: Mar. 23, 1972

[21] Appl. No.: 237,434

[52] U.S. Cl. .............................................. 219/160
[51] Int. Cl. ............................................ B23k 9/02
[58] Field of Search ...................... 219/160; 29/491; 228/50

[56] References Cited
UNITED STATES PATENTS

| | | | |
|---|---|---|---|
| 3,365,566 | 1/1968 | Kuder | 219/160 |
| 3,525,844 | 8/1970 | Johnson | 219/160 X |
| 3,229,884 | 1/1966 | Franklin et al. | 219/160 X |
| 2,145,009 | 1/1939 | Keir | 29/491 |

Primary Examiner—J. V. Truhe
Assistant Examiner—Hugh D. Jaeger
Attorney—Julius L. Solomon

[57] ABSTRACT

A flexible backup for closing the gap across the bottom of plates to be arc welded comprising a flexible tape shaped to form a trough along the center of its length which is filled with a refractory and deoxidizing material and metal segments of a width sufficient to cover the gap. Adhesive material is provided along the length of the exposed sides of the tape for holding the tape to the parts to be welded.

4 Claims, 2 Drawing Figures

BACKUP TAPE FOR NARROW GAP WELDING

This invention refers to a product which is useful when practicing the arc welding process and refers, specifically, to a means for closing the open root of the joint being welded so as to allow the formation of a weld bead or beads at the root of the gap across which the joint is to be formed. The product has means for preventing oxidation of the area surrounding the root of the joint and may be applied to the welding of curved as well as flat work pieces.

The invention may be applied when arc welding by the use of the metal inert gas electric arc welding process.

In the welding of thick plates by the metal inert gas process the procedure heretofore has been to shape the edges of the work so as to form a V groove which narrows down at its root so that the two plates are either in contact or slightly separated. A non-consummable copper backup bar is placed along the desired seam on the surface of the plates closest to the narrowest dimension of the V groove. This copper backup bar may have machined in it a groove which is placed under the seam. In the metal inert gas welding process filler wire of a material suited to the materials being welded is heated and melted by the arc struck between the end of the filler wire and the bottom of the groove formed between the two plates being welded. The filler wire is fed to the weld area from a reel by means of a suitable wire drive mechanism. During the first weld path the arc is struck between the filler area and the metal at the bottom of the groove and the molten material from the filler wire fills the space between the two plates and is often cast into a small groove which is machined lengthwise in the copper backup bar. the V groove is gradually filled with the filler wire by making a series of weld passes along the bottom of the groove. The gap between the two plates is gradually filled up by the metal deposited from the filler wire in overlaying passes and the weld is completed when this gap is completely filled. After completion of the weld, the copper backup bar is removed and may be reused for subsequent welds. The welding of thick plates by this method has always been a lengthy and costly operation because of the great amount of metal which must be deposited in the groove. In order to reduce the overall welding time and the amount of weld metal required to be deposited and to thus improve the characteristics of the weld area by reducing the heat input to the work and thus reduce the heat affected zone, a method of welding has been developed which does not require special edge preparation of the joint by the formation of a V groove but in which the square edges of the two thick plates to be welded are merely separated by approximately ¼ inch. In this process two torches are usually used simultaneously, one which lays a weld bead along the bottom of one of the edges of the plate and a second which lays a bead along the bottom of the edge of the second plate, the two beads merging within the ¼ inch gap so as to form a solid joint between the two plates. Because of the wide separation between the plates, it is absolutely necessary that a backup bar having good electrical conductive properties be utilized so that an arc may be struck from the feed wire to the area ground the bottom of the edge of each plate to its respective consummable feed wire. Should this backup not be present, the material that is being molten from the end of the consummable wire will drop through the gap so that a proper root weld will not be developed. Furthermore, the arc will be found to travel up along the edge of the plate. Inasmuch as the work pieces to be welded are very often of irregular shape, or have cylindrical or spherical surfaces, or they require lines of welding that are not along a straight line, it is extremely difficult to provide copper backups inasmuch as these must be machined to fit each particular job so that the copper backup shape conforms to the shape of the work pieces. It is also necessary to provide a flux under the root portion of the weld in order to prevent oxidation and resulting deterioration of the material being welded.

It is the object of the present invention to provide a means for properly backing up a weldment in which the gap between the square edges of the parts being welded is greater than the space over which the molten metal could be supported by the forces of surface tension.

Another object of the invention is to provide a simple means for backing up irregular shaped lines of weld and welds over curved bodies.

It is another object of the invention to provide a flux behind the weld in order to prevent oxidation of the weld area.

An ancillary object of the present invention is to provide a backup which is consummable and becomes a part of the weld area.

Figure 2:
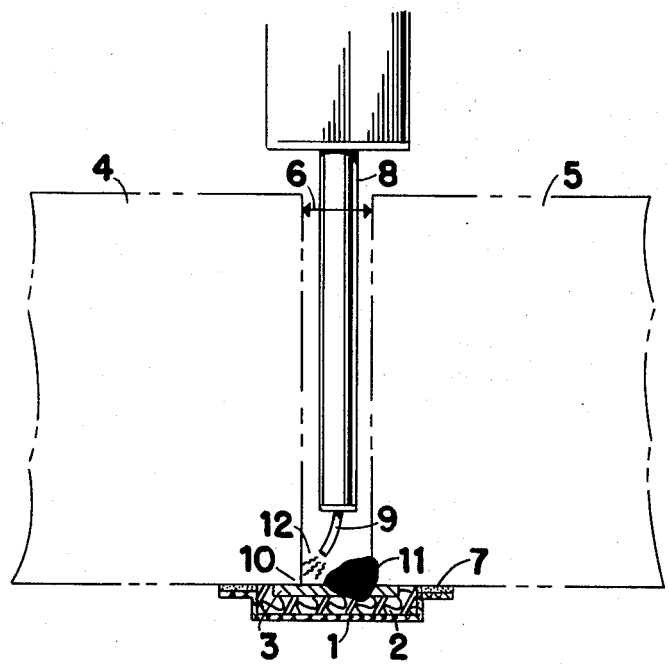

The invention may best be understood from the following description of an example of the consummable backup fluxing tape made in accordance with the invention is which FIG. 1 is a perspective drawing of the backup tape as applied to two plates to be welded and FIG. 2 is a cross section of the invention.

Referring to FIG. 1, the material to be welded plates 4 and 5 are shown in phantom separated by a narrow gap 6. The small flat end of a welding torch 8 through which the consummable wire 9 is fed to the bottom of the gap moves along the gap during the welding operation. A series of metal segments 3, perhaps one-tenth of an inch thick and approximately one-half inch square, are laid end to end in a bed of welding flux 2 and the flux and metal segments are supported by flexible tape 1 which bears an adhesive coating 7 along its two sides so that the tape may be pressed against and caused to adhere to the work underneath the seam. a thin plastic or paper strip is used to protect the adhesive while the backup strip is stored for eventual use. Just prior to use this protective cover is removed and the backup strip applied to the work and held to it by the adhesive. The fluxing material may be any compound of chemically deoxidizing materials which are free of organic contaminates. This material acts to exclude oxygen and hydrogenous materials from the molten metal during the melting and solidification phases of the first few weld passes of the process. The metal inserts act to effectively close the gap at the bottom of the space between the two plates. Inasmuch as the tape is flexible and the metal backup is in the form of segments, the backup tape may be applied to curved lines of weld or curved surfaces and thus effectively close the relatively wide gap at the bottom of the separation between the plates so as to prevent the molten droplets from the feed wire from falling through the gap. Furthermore, the material in the metal segments is consolidated in the weld area during the welding operation and forms an effective underbead.

FIG. 2 is a cross sectional view of the work pieces 4 and 5 separated by a gap 6 which shows the welding torch 8 positioned centrally in the gap with the consummable wire 9 directed to the corner formed by the plate on the left and the metal backup segment 3. An electric arc 12 is formed across the gap between the end of the filler wire 9 and the area 10 at the corner formed by the work piece and the segment. The intense heat in the arc melts the feed wire and the metal at the surface of the material in the corner and a weld bead is formed in the corner by the metal deposited from the wire feed as the torch is carried along the seam. The weld bead 11 which has already been formed on the opposite corner of the bottom of the gap has generally the form in cross section as indicated at 11. The bead formed on the left side of the gap will overlay the bead on the right and combine with it to form a solid continuous weld across the bottom of the gap so that by two welding passes, one on the right corner and a second on the left corner, the bottom of the groove is completely closed with a solid conductive material. Successive passes may then be made with the arc forming at the corners of the bottom of the groove between the feed wire and the corner formed by the topmost bead and the closest plate. Successive layers of weld bead are now applied until the gap is completely filled, the gun being automatically raised for each welding path through the action of servo controls which maintain the arc length at some pre-established value.

Attempts have been made to substitute powdered iron in place of the metal segments or to use a flexible backing of refractory material only but it was found that an arc could not be sustained between the powdered iron particles and the feed wire because of the extremely low conductivity of the powdered iron particles or the refractory material. It was found that in order to have the arc form in the corner it is necessary to use conductive metal segments. With powdered iron as a backup the wire would merely drive itself through the powdered iron and a proper arc could not be sustained.

What I claim is:

1. A backup for closing the gap across the bottom of plates to be arc welded, comprising a flexible tape shaped to form a trough along the center area of its length, a refractory fluxing material within said trough of the flexible tape, consummable metal segments of the same material as the plates to be welded laid end to end along the upper surface of the said refractory fluxing material so as to be in electrical contact with the bottom of the said plates and coalesce with the said plates during the welding process, a pressure adhesive material along the length of exposed sides of the said tape and removable means for covering and protecting the said adhesive material.

2. A backup as in claim 1 in which the refractory fluxing material is a compound of chemically deoxidizing materials which are free of organic contaminates.

3. A backup as in claim 1 in which the segments are of short length so as to allow the said backup to conform to the shape of the work pieces, curved or straight, to be welded.

4. A backup as in claim 1 in which the said segments are approximately one tenth of an inch in thickness and are of a material having a composition compatible to the material being welded.

* * * * *